United States Patent [19]

Dhyanchand et al.

[11] Patent Number: 5,041,957
[45] Date of Patent: Aug. 20, 1991

[54] STEPPED-WAVEFORM INVERTER WITH SIX SUBINVERTERS

[75] Inventors: P. John Dhyanchand; Sunil Patel; Chai-Nan Ng; Vietson Nguyen, all of Rockford, Ill.

[73] Assignee: Sundstrand Corporation, Rockford, Ill.

[21] Appl. No.: 453,972

[22] Filed: Dec. 20, 1989

[51] Int. Cl.$^5$ .................. H02M 1/12; H02M 5/458
[52] U.S. Cl. ................................. 363/43; 363/71
[58] Field of Search ........................ 363/43, 71, 72

[56] References Cited

U.S. PATENT DOCUMENTS

| Re. 28,986 | 9/1976 | Heinrich et al. ............. 363/71 |
| 3,609,507 | 9/1971 | Beck ............................. 363/71 X |
| 3,638,094 | 1/1972 | Ve Nard, II .................... 363/71 |
| 3,767,996 | 10/1973 | Bates ............................ 363/71 |
| 3,775,662 | 11/1973 | Compoly et al. ............... 363/43 |
| 3,832,620 | 8/1974 | Pollard ....................... 363/35 X |
| 4,032,832 | 6/1977 | Miller ........................... 363/43 |
| 4,052,657 | 10/1977 | Kleiner et al. ............... 363/71 |
| 4,131,936 | 12/1978 | Gemp ......................... 363/71 X |
| 4,159,513 | 6/1979 | Gemp et al. .................. 363/71 X |
| 4,276,589 | 6/1981 | Okawa et al. ................. 363/71 |
| 4,429,357 | 1/1984 | Häusler et al. ............... 363/68 |
| 4,467,407 | 8/1984 | Asano et al. .................. 363/43 |
| 4,494,179 | 1/1985 | Inokuchi et al. .............. 363/35 |
| 4,595,976 | 6/1986 | Parro, II ....................... 363/41 |
| 4,761,726 | 8/1988 | Brown .......................... 363/51 |
| 4,786,852 | 11/1988 | Cook ............................ 322/10 |

FOREIGN PATENT DOCUMENTS 1046876A 6/1979 U.S.S.R. .

OTHER PUBLICATIONS

O'Sullivan, "Which DC/AC Inverter?", Electronic Design, Dec. 6, 1974.
Sriraghaven, et al., "An Improved Three Phase Stepped-Voltage Inverter", Int. J. Electronics, pp. 497-502 (1980).

Primary Examiner—Steven L. Stephan
Assistant Examiner—Emanuel Todd Voeltz
Attorney, Agent, or Firm—Marshall, O'Toole, Gerstein, Murray & Bicknell

[57] ABSTRACT

An inverter for use in a power conversion system of the type used in an aircraft, for example, includes a first subinverter pair that generates a first pair of waveforms, a second subinverter pair that generates a second pair of waveforms, and a third subinverter pair that generates a third pair of waveforms. The three subinverter pairs are connected to a summing transformer having first, second and third transformers. A regulator is coupled to the output of the summing transformer and varies the phase angles between the three pairs of waveforms generated by the three subinverter pairs based upon the voltage and current at the output of the summing transformer in order to regulate the voltage at the output of the summing transformer.

8 Claims, 12 Drawing Sheets

STEPPED-WAVEFORM INVERTER WITH SIX SUBINVERTERS

Technical Field

The present invention relates to a power conversion system, and more particularly to an inverter for a power conversion system.

Background Art

Power conversion systems, such as variable-speed, constant-frequency (VSCF) power conversion systems, are commonly used in aircraft and aerospace applications to generate AC and DC power from a prime mover, such as a jet engine. In such an application, variable-frequency AC power may be produced by a brushless, synchronous generator driven by the jet engine. The variable-frequency AC power is converted to DC power by an AC/DC converter, such as a rectifier bridge. An inverter is coupled to the AC/DC converter to transform the DC power into constant-frequency AC power, which is then filtered by a filter. The filtered AC output is then provided to an AC load bus which supplies power to various points throughout the aircraft.

The inverter used in VSCF systems may be of the stepped-waveform type. An inverter of this type is disclosed in U.S. Pat. No. 3,775,662 to Compoly, et al. Such a stepped-waveform inverter generates an output having a stepped shape that generally approximates a sine wave. The purpose of approximating a sine wave is to reduce the size of the filters, provided at the output of the inverter, that are used to remove unwanted harmonics. While previous stepped-waveform inverters may accomplish such goals, efficient and effective methods of control of such inverters have heretofore been lacking.

Summary of the Invention

The present invention is directed to an inverter for use in a power conversion system. The inverter converts DC power into constant-frequency AC power. The inverter includes a summing transformer and is responsive to the AC power generated by the power conversion system. The inverter regulates the AC power by controlling the phase angles between various waveforms produced by a number of subinverters of the inverter.

In one aspect, the invention is directed to an inverter for use in a power conversion system that produces an AC output. The inverter has a summing transformer that includes six three-phase transformers. The transformers are grouped into three subgroups. Each subgroup consists of two subinverters and two three-phase transformers. One of the two three-phase transformers in each subgroup has star-connected primary windings and the other three-phase transformer has delta-connected primary windings. The transformers have secondary windings coupled to the primary windings.

Each of the subinverters generates a respective waveform in the primary windings of its associated transformer. The phase angle between two of the waveforms is a first variable angle, and the phase angle between another two of the waveforms is a second variable angle. A regulator circuit is coupled to sense the AC output, and the regulator circuit controls the first variable angle and the second variable angle based upon the AC output.

In another aspect of the invention, the regulator circuit senses both the current and voltage of the AC output, and the regulator circuit controls the first variable angle based upon the sensed voltage and the second variable angle based upon the sensed current.

These and other aspects, features, and advantages of the present invention will be apparent to those of ordinary skill in the art in view of the detailed description of the preferred embodiments, which is made with reference to the drawings, a brief description of which is provided below.

DESCRIPTION OF THE PREFERRED EMBODIMENT

Figure 1:
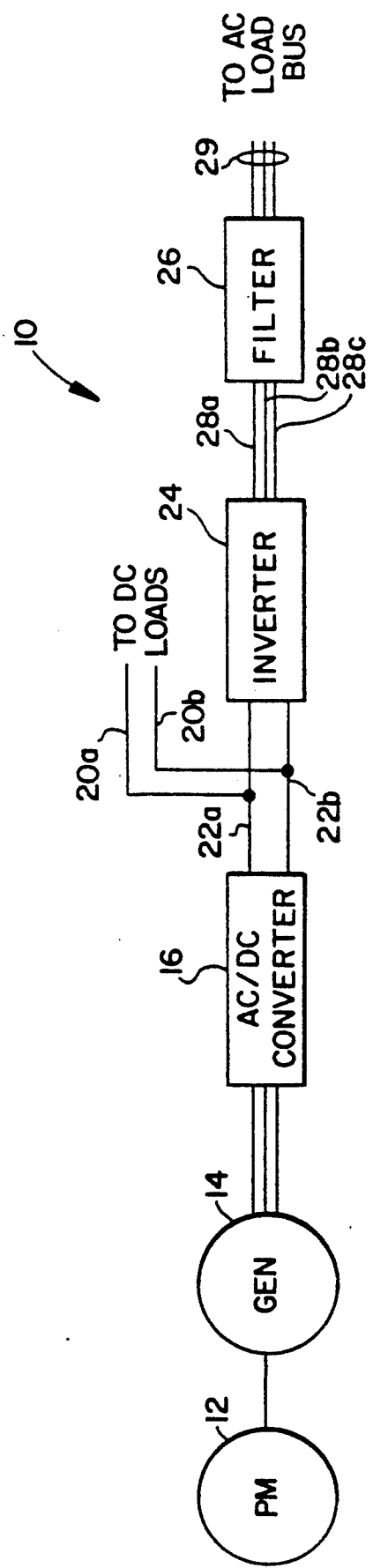
FIG. 1 is a block diagram of a VSCF power conversion system for generating AC and DC power from a prime mover.

A block diagram of a preferred embodiment of a VSCF power conversion system 10 incorporating the present invention is shown in FIG. 1. The VSCF system 10 includes a prime mover 12 coupled to a generator 14 for generating variable-frequency AC power. An AC/DC converter 16 is coupled to the generator 14 for converting the variable-frequency AC power into DC power. The DC output of the AC/DC converter 16 is supplied to various DC loads in the aircraft via a pair of lines 20a, 20b. A second pair of lines 22a, 22b provides the DC output to an inverter 24, which generates three-phase, constant-frequency AC power from the DC output of the converter 16. The inverter 24 is coupled to a filter 26 via three output lines 28a, 28b, 28c, each of which supplies a respective phase of the constant-frequency AC output to the filter 26. The output of the filter 26 is provided via lines 29 to a three-phase AC load bus which supplies AC power to various AC loads in the aircraft.

Figure 2:
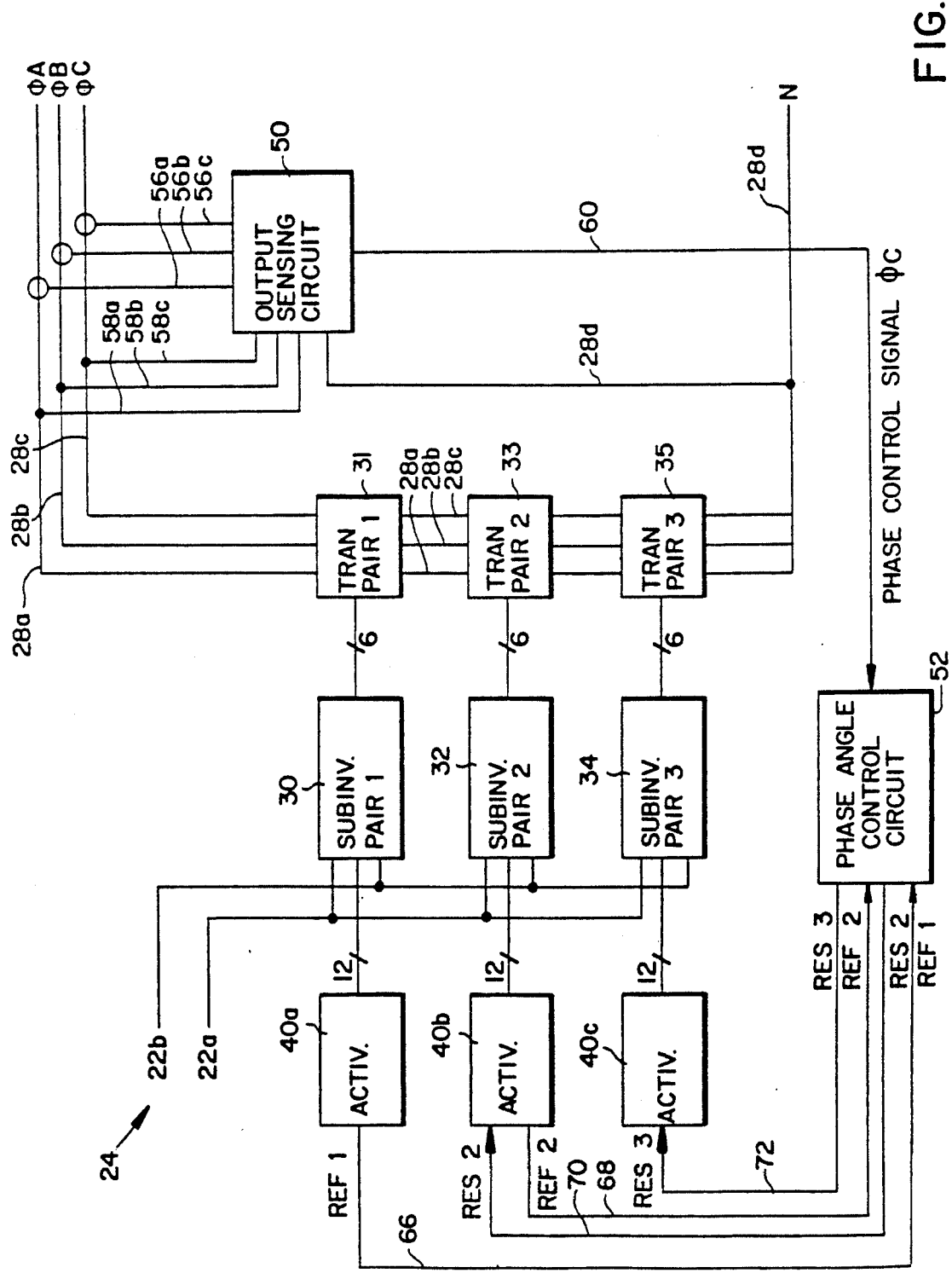
FIG. 2 is a block diagram of the inverter of FIG. 1.

A block diagram of the inverter 24 is shown in FIG. 2. The inverter 24 includes three subinverter pairs 30, 32, 34. Each of the subinverter pairs 30, 32, 34 is coupled to a respective transformer pair 31, 33, 35. The output lines 28a, 28b, 28c interconnect each of the transformer pairs 31, 33, 35, and the transformer pair 35 is connected to a neutral line 28d. Each of the subinverter pairs 30, 32, 34 is controlled by a respective activation circuit 40a–c.

A regulator circuit for regulating the voltage on the transformer output lines 28a, 28b, 28c is shown to comprise an output sensing circuit 50 and a phase angle control circuit 52. The output sensing circuit 50 senses the current on the three transformer output lines 28a, 28b, 28c via three lines 56a, 56b, 56c, and the sensing circuit 50 senses the voltage on the three output lines 28a, 28b, 28c via three lines 58a, 58b, 58c. The output sensing circuit 50 generates a phase control signal, $\Phi_c$, having a magnitude based on both the voltage and current sensed on the lines 28a–c and provides the $\Phi_c$ signal to the phase control circuit 52 via a line 60. Based on the magnitude of the $\Phi_c$ signal, the phase angle control circuit 52 causes the phase angles between the various waveforms generated by the three subinverter pairs 30, 32, 34 to be varied. As a result of the control of the phase angles, the magnitude of the voltage on the transformer output lines 28a, 28b, 28c is regulated.

Alternatively, instead of sensing the AC output on the lines 28a–c, the regulator circuit could sense the AC output on the lines 29 after the AC output is filtered by the filter 26.

The phase angle control circuit 52 varies the magnitude of the phase angles by generating a pair of reset signals, RES2 and RES3, based upon the magnitude of the phase control signal $\Phi_c$ and a pair of reference signals, REF1 and REF2. The REF1 and REF2 signals are transmitted to the phase angle control circuit 52 from the first and second activation circuits 40a, 40b via a pair of lines 66, 68, respectively. The RES2 and RES3 signals are transmitted from the phase angle control circuit 52 to the second and third activation circuits 40b, 40c via a pair of lines 70, 72, respectively. As described in more detail below, the RES2 signal controls the phase angle between the waveforms generated by the first subinverter pair 30 and the waveforms generated by the second subinverter pair 32, and the RES3 signal controls the phase angle between the waveforms generated by the second subinverter pair 32 and the waveforms generated by the third subinverter pair 34.

Figure 3:
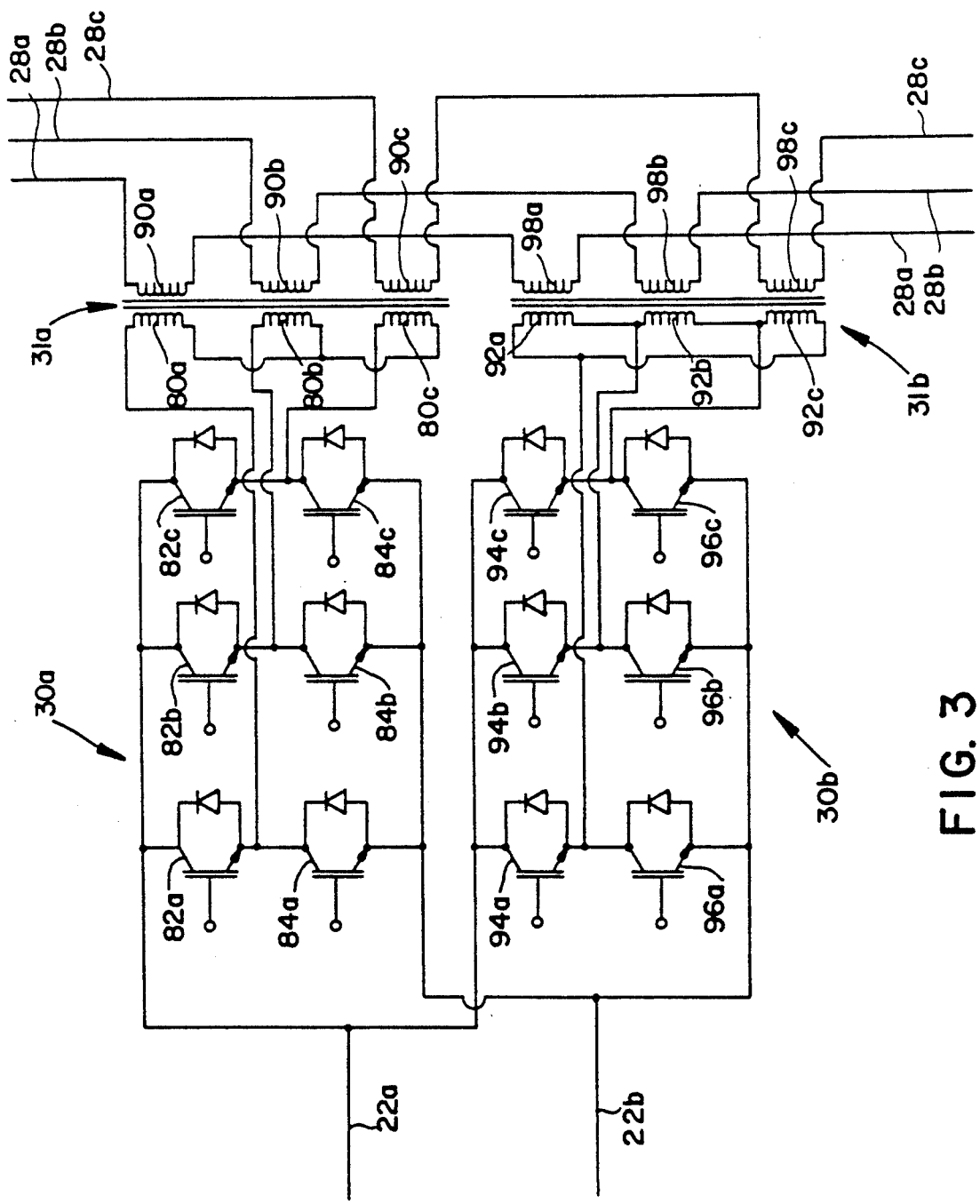
FIG. 3 is a circuit diagram of one pair of subinverters and their associated transformers of the inverter of FIG. 2.

The first subinverter pair 30 and the first transformer pair 31 are shown in FIG. 3. The first subinverter pair 30 includes two subinverters 30a, 30b, and the first transformer pair 31 includes two three-phase transformers 31a, 31b.

The subinverter 30a includes six transistor switches 82a–c, 84a–c, each of which has a diode connected across it. The subinverter 30a is connected to three star- or wye-connected primary windings 80a–c of the transformer 31a which are controlled by the three pairs of switches 82a–c, 84a–c. The upper terminal of the winding 80a is connected to the junction of the switches 82a, 84a; the upper terminal of the winding 80b is connected to the junction of the switches 82b, 84b; and the upper terminal of the winding 80c is connected to the junction of the switches 82c, 84c. The primary windings 80a–c of the transformer 31a are coupled to three secondary windings 90a–c, respectively.

During operation of the subinvert 30a, exactly one of the two switches in each vertical branch is conducting. In particular, one of the two switches 82a, 84a is conducting and the other is off; one of the switches 82b, 84b is conducting and the other is off; and one of the switches 82c, 84c is conducting and the other is off. The switches 82a–c and 84a–c are switched in a conventional manner to generate the waveform 220 in FIG. 5 on each of the three wye-connected windings 80a–c, each of the three waveforms differing in phase by 120°. Because the windings 80a–c are wye-connected, the waveform 220 has five possible amplitudes at any point in time, $+A$, $+A/2$, 0, $-A/2$, and $-A$, where A is the maximum amplitude.

The subinverter 30b includes six transistor switches 94a–c, 96a–c, each of which has a diode connected across it. The subinverter 30b is connected to three delta-connected primary windings 92a–c of the transformer 31b which are controlled by the three pairs of switches 94a–c, 96a–c. The upper terminal of the winding 92a is connected to the junction of the switches 94a, 96a; the upper terminal of the winding 92b is connected to the junction of the switches 94b, 96b; and the upper terminal of the winding 92c is connected to the junction of the switches 94c, 96c. The three delta-connected primary windings 92a–c are coupled to three secondary windings 98a–c of the transformer 31b, respectively.

Figure 5:
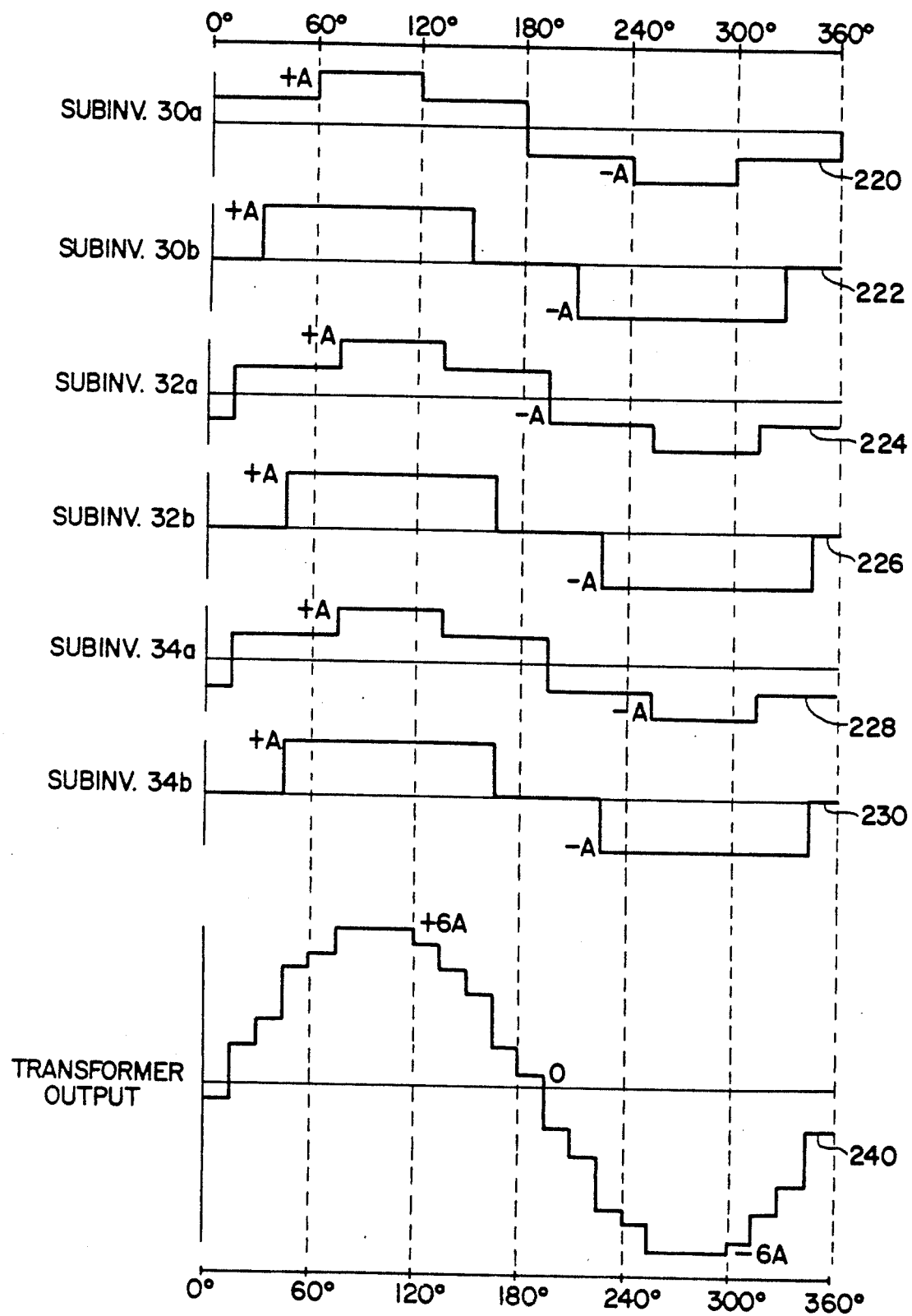
FIG. 5 illustrates a first phase relationship of a number of waveforms generated by the inverter and a waveform produced by the summation of those waveforms.

The switches 94a–c and 96a–c are switched in a manner similar to switches 82a–c and 84a–c to generate the waveform 222 in FIG. 5 on each of the three delta-connected windings 92a–c, each of the three waveforms 222 having a phase difference of 120°. Because the windings are delta-connected, such a waveform has three possible amplitudes, $+A$, 0, and $-A$, where A is the maximum amplitude.

While the switches 82a–c, 84a–c, 94a–c, 96a–c are shown to be transistors, other types of switches may be used, such as thyristors or Darlington-connected transistor pairs.

The circuit diagrams for the second and third subinverter pairs 32, 34 and the second and third transformer pairs 33, 35 are identical to the one shown in FIG. 3 and are not shown separately for purposes of simplicity.

Figure 4:
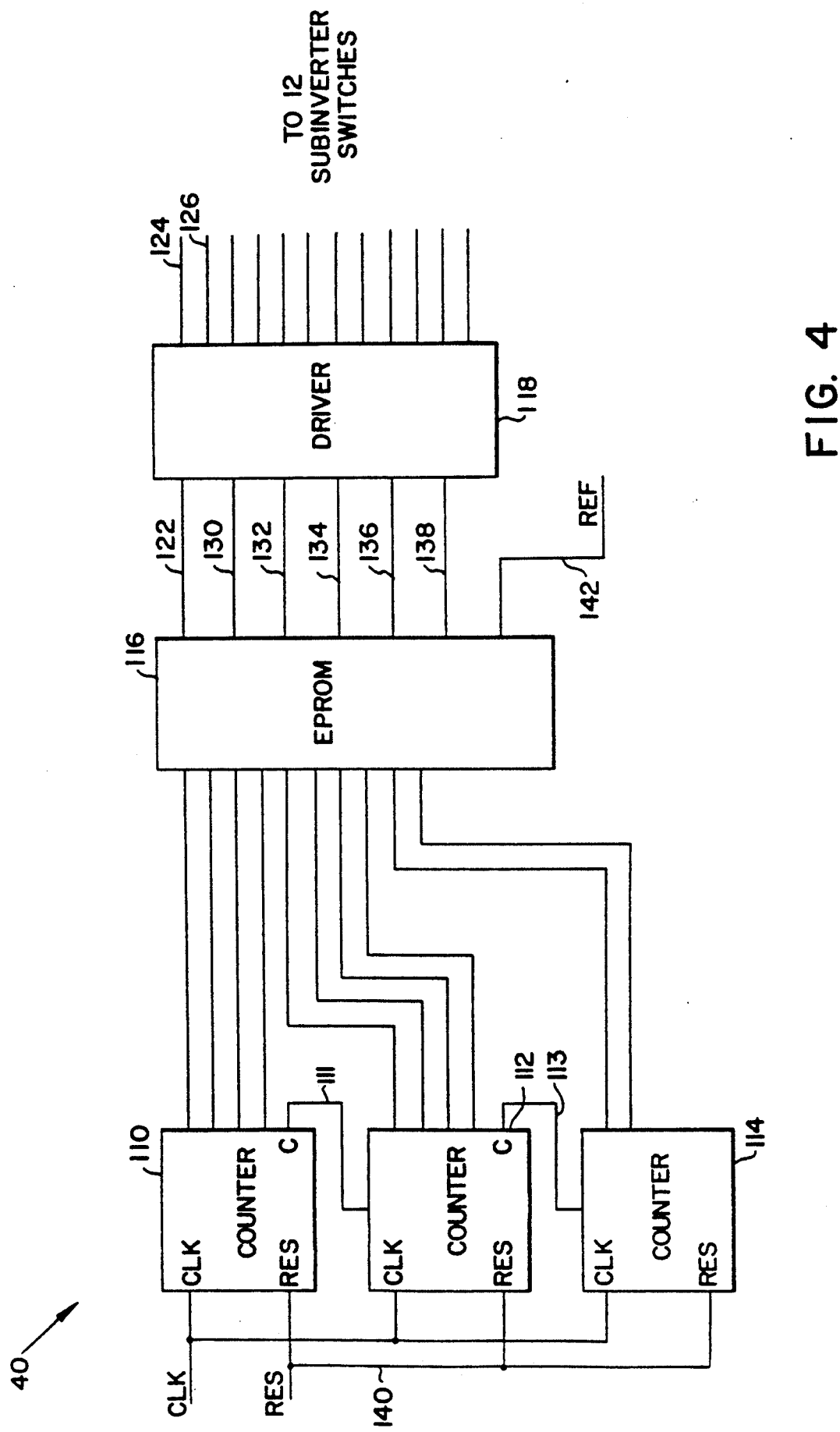
FIG. 4 is a circuit diagram of one of the activation circuits of FIG. 2.

The activation of the twelve switches 82a–c, 84a–c, 94a–c, 96a–c in each of the subinverter pairs 30, 32, 34 is controlled by a respective one of the activation circuits 40a–c. Since the three activation circuits 40–c are substantially identical, only one is shown. Referring to FIG. 4, the activation circuit 40 includes three four-bit counters 110, 112, 114 connected to an EPROM 116 connected to a driver circuit 118. The counters 110, 112, 114 are driven by a clock signal, CLK, generated by a main controller (not shown). The carry output of the counter 110 is input to the counter 112 via a line 111, and the carry output of the counter 112 is input to the counter 114 via a line 113. Upon each pulse of the CLK signal, the 10-bit output of the counters 110, 112, 114 is incremented by one. This 10-bit output is used as an address to address the EPROM 116.

The EPROM 116 has a six-bit binary code stored in each of its address locations. The six binary bits control the activation of the 12 switches in one of the subinverters. In particular, one bit of the six-bit binary code is output on the line 122 to the driver 118, which generates an uncomplemented switching signal on a line 124 and a complemented switching signal on a line 126. The line 124 is connected to the base of one transistor in one vertical branch of one of the subinverters, such as switch 82a, and the line 126 is connected to the base of the other switch in the vertical branch, such as switch 84a.

The remaining five bits of the six-bit binary code are output on the lines 130, 132, 134, 136, 138, respectively, to the driver circuit 118, which generates on its outputs a pair of complemented driving signals for each of the five binary signals. These driving signals are supplied to the remaining switches of the subinverter.

During operation of the activation circuit 40, as the CLK signal supplied to the counters 110, 112, 114 is periodically incremented, the six bits of the binary code are periodically output from the EPROM 116 via lines 122, 130-138 to the driver 118, and the 12 switches of each of the subinverters 30a, 30b, 32a, 32b, 34a, 34b are controlled to generate the waveforms 220, 222, 224, 226, 228, 230 shown in FIG. 5 on the primary windings of each of the transformers 31a, 31b, 33a, 33b, 35a, 35b, respectively.

The EPROM 116 generates a reference signal, REF, on a line 142. As described in more detail below, the REF signal is used as a phase reference signal.

A reset signal, RES, may be input to the counters 110, 112, 114 via a line 140. When the RES signal is activated, the counters 110, 112, 114 are reset, thus providing a 10-bit address to the EPROM 116 equal to zero. The contents of each EPROM in the three activation circuits 40-c are identical. If each of the EPROMs is given the same sequence of addresses, the resulting waveforms generated by the subinverters would be identical and thus have zero phase angle. Accordingly, the time of reset of the counters 110, 112, 114 of an activation circuit determines the phase angle between the waveforms generated by that activation circuit and the waveforms generated by the other two activation circuits.

When the activation circuit 40 of FIG. 4 is used for the activation circuit 40a shown in FIG. 2, the REF line 142 of FIG. 4 is connected to the REF1 line 66 of FIG. 2, and the RES line 140 of FIG. 4 is not used. When the activation circuit 40 of FIG. 4 is used for the activation circuit 40b, the REF line 142 of FIG. 4 is connected to the REF2 line 68 of FIG. 2, and the RES line 140 of FIG. 4 is connected to the RES2 line 70 of FIG. 2. When the activation circuit 40 of FIG. 4 is user for the activation circuit 40c, the RES line 140 of FIG. 4 is connected to the RES3 line 72 of FIG. 2, and the REF line 142 of FIG. 4 is not used.

Stepped-waveform inverters having six subinverters as shown in FIG. 2 are referred to as 36-step inverters.

Referring to FIG. 5, the waveforms generated by the subinverters 30a, 30b, 32a, 32b, 34a, 34b in the primary windings of the transformers 31a, 31b, 33a, 33b, 35a, 35b are shown. The summing transformer output waveform 240 shown in the bottom portion of FIG. 5 is generated on each of the three transformer output lines 28a, 28b, 28c, each of the three waveforms 240 being 120° apart. The waveform 240 represents the summation of the waveforms 220, 222, 224, 226, 228, 230.

The inverter 24 of the present invention has two modes of operation. A first mode of operation is used when the current on the output lines 28-c of the summing transformer is below a predetermined threshold. A second mode of operation is used when the output current is above the predetermined threshold.

In the first mode of operation, the phase angle between the waveforms generated by the first subinverter pair 30 and the waveforms generated by the second subinverter pair 32 is held constant, preferably 15°, and the phase angle between the waveforms generated by the second subinverter pair 32 and waveforms generated by the third subinverter 34 is varied, depending upon the output voltage sensed on the transformer output lines 28a-c.

Figure 6:
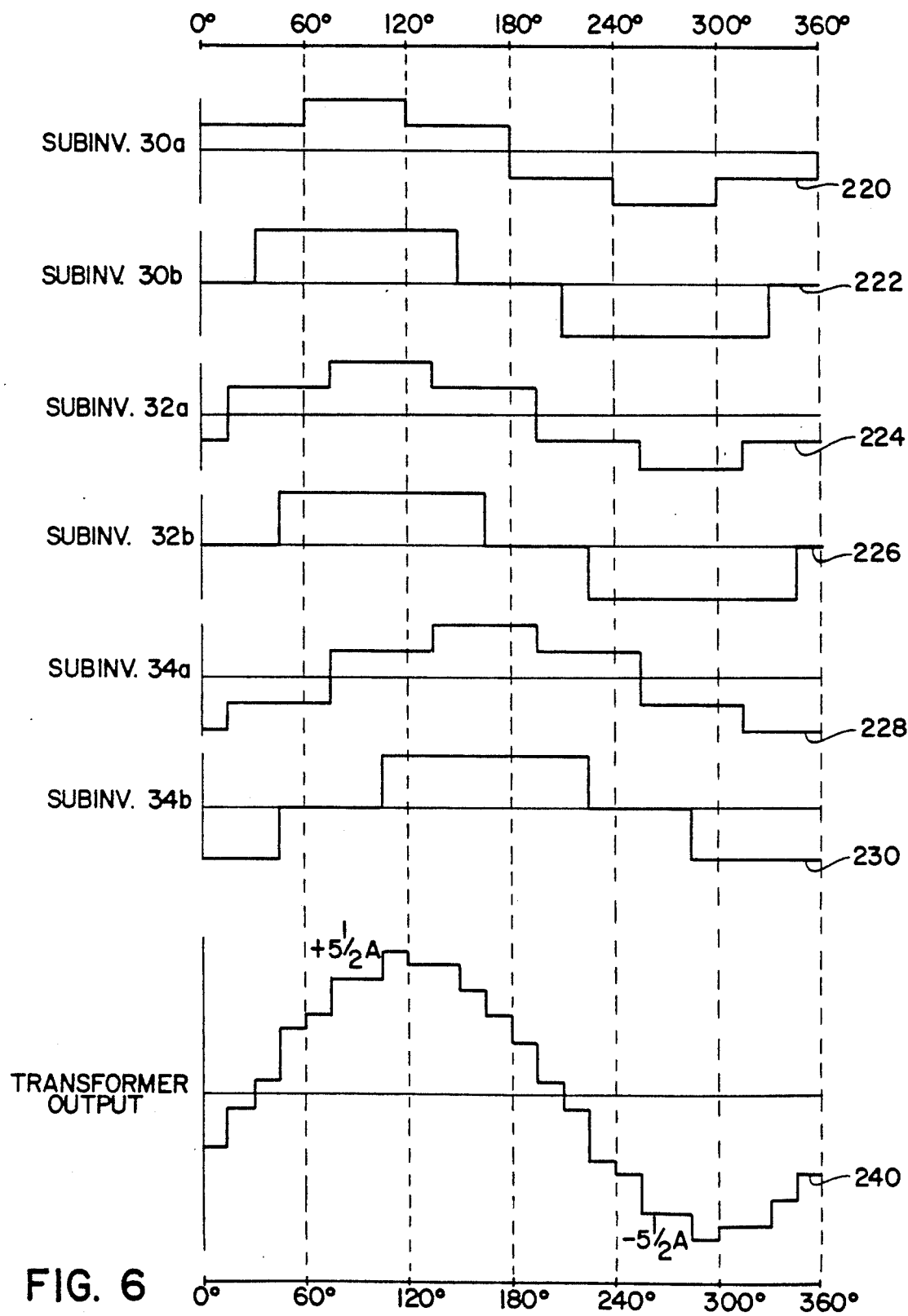
FIG. 6 illustrates a second phase relationship of a number of waveforms generated by the inverter and a waveform produced by the summation of those waveforms.

The waveforms shown in FIGS. 5 and 6 illustrate the first mode of operation. It should be noted that the first subinverter pair waveforms 220, 222 and the second subinverter pair waveforms 224, 226 of both FIGS. 5 and 6 have a fixed phase angle of 15°. However, the phase angle between the second subinverter pair waveforms 224, 226 and the third subinverter pair waveforms 228, 230 is 0° in FIG. 5 and 60° in FIG. 6. By controlling the phase angle between the second and third subinverter pair waveforms, the resultant output voltage may be regulated. For example, the waveform 240 of FIG. 5 has a peak positive amplitude of +6A and a peak negative amplitude of −6A, whereas the output voltage waveform 240 of FIG. 6 has a peak positive amplitude of $+5\frac{1}{2}A$ and a peak negative amplitude of $-5\frac{1}{2}A$.

Figure 9A:
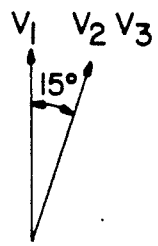
FIGS. 9a-9c are vector diagrams illustrating a first mode of operation of the inverter of the invention.
Figure 9B:
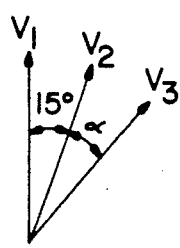
Figure 9C:
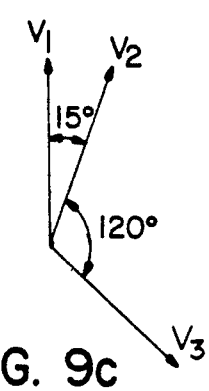

Referring to FIGS. 9a-9c, the vector diagrams in those figures illustrate the first mode of operation. The vector $V_1$ represents the first subinverter pair waveforms 220, 222; the vector $V_2$ represents the second subinverter pair waveforms 224, 226; and the vector $V_3$ represents the third subinverter pair waveforms 228, 230. In each of FIGS. 9a-c, the phase angle between $V_1$ and $V_2$ is constant, at 15°. The phase angle between $V_2$ and $V_3$ may vary from a minimum phase angle of 0° as shown in FIG. 9a to a maximum phase angle of 120° as shown in FIG. 9c. In between the minimum and maximum phase angles, the phase angle may be any variable angle $\alpha$ as shown in FIG. 9b. The vector positions shown in FIGS. 9a and 9c represent the extreme phase angles of the first mode of operation, and during normal operation the phase angles will be as shown in FIG. 9b.

In the second mode of operation, the phase angle between the waveforms generated by the first and second subinverter pairs is a variable angle between 15° and 120°, while the phase angle between the waveforms generated by the second and third subinverter pairs is held constant, preferably 120°. As a result, the voltage on the transformer output lines is gradually reduced to zero. The second mode of operation is used when the current on the output lines 28a-c is above the predetermined threshold.

Figure 7:
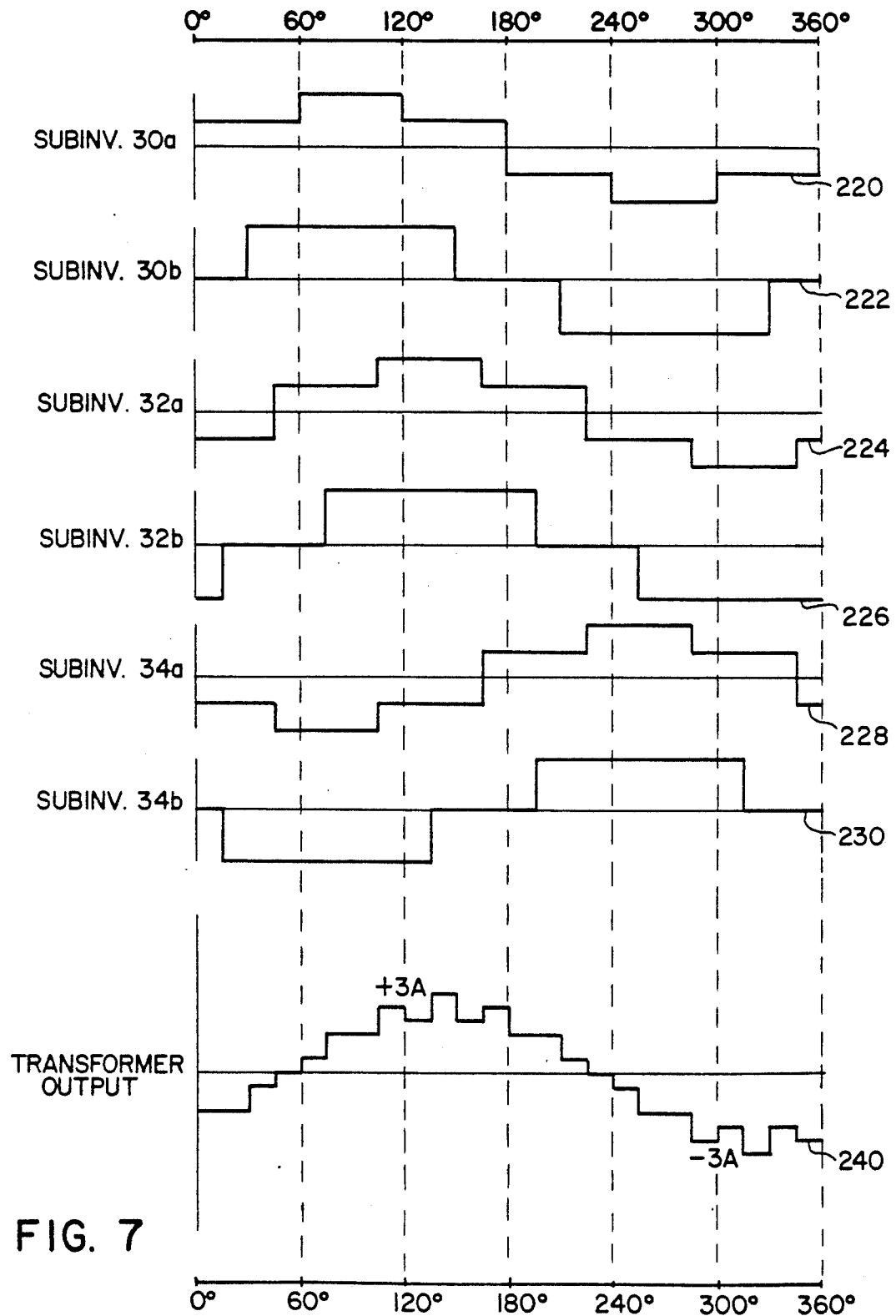
FIG. 7 illustrates a third phase relationship of a number of waveforms generated by the inverter and a waveform produced by the summation of those waveforms.
Figure 8:
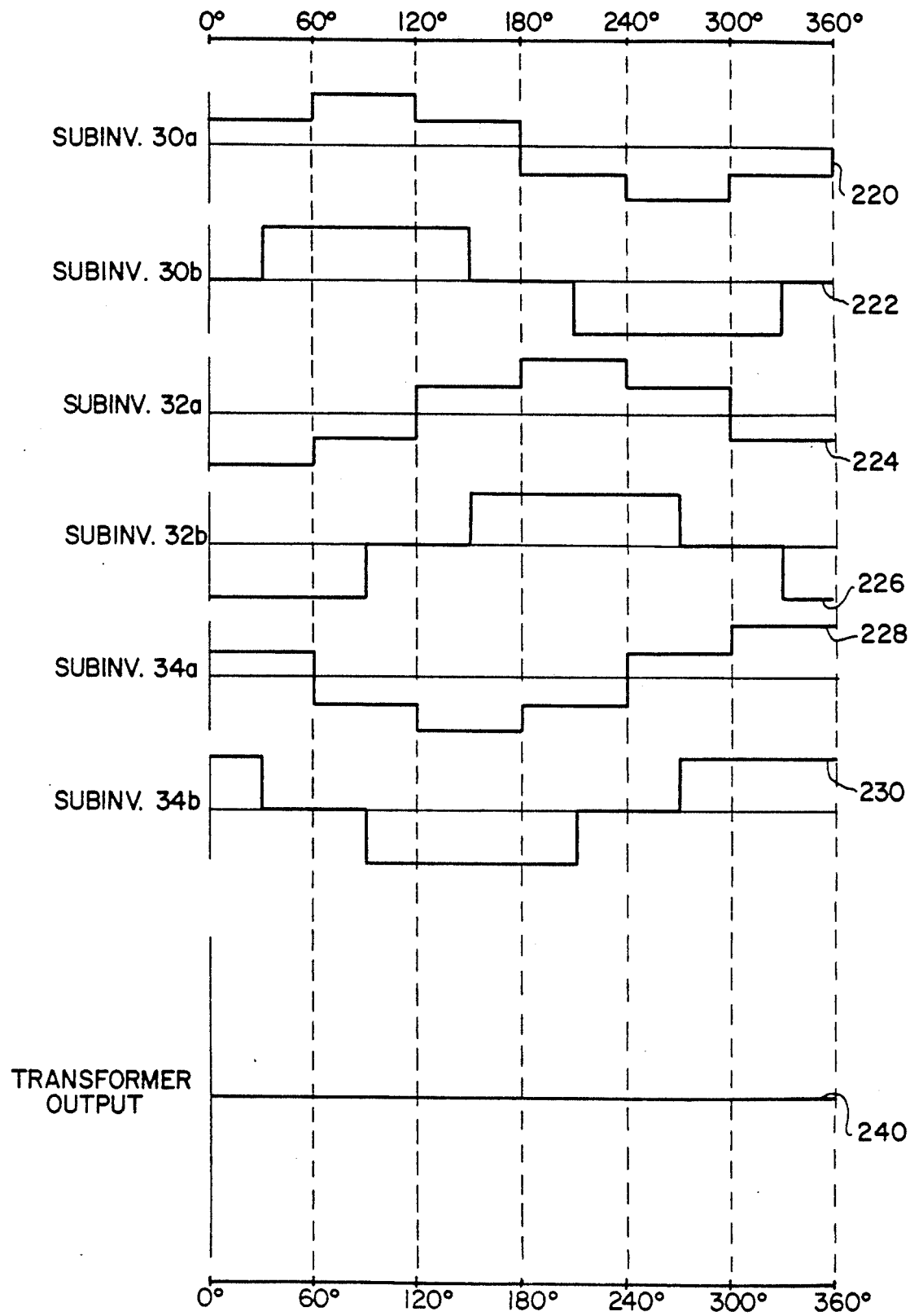
FIG. 8 illustrates a fourth phase relationship of a number of waveforms generated by the inverter and a waveform produced by the summation of those waveforms.

The waveforms shown in FIGS. 7 and 8 illustrate the second mode of operation. In FIGS. 7 and 8, the third subinverter pair waveforms 228, 230 lag the second subinverter pair waveforms 224, 226 by a constant 120°. However, the phase angle between the first subinverter pair waveforms 220, 222 and the second subinverter pair waveforms 224, 226 is 45° in FIG. 7 and 120° in FIG. 8. The transformer output voltages, which are represented by the waveforms 240 in FIGS. 7 and 8, are gradually reduced to zero. In FIG. 7, the amplitude of the waveform 240 reaches a peak amplitude of +3A between 135° and 150° and −3A between 315° and 330°, and in FIG. 8 the waveform 240 has zero amplitude.

Figure 10A:
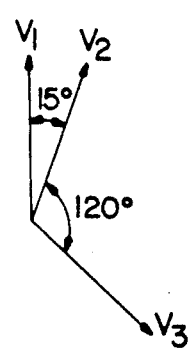
FIGS. 10a-10c are vector diagrams illustrating a second mode of operation of the inverter of the invention.
Figure 10B:
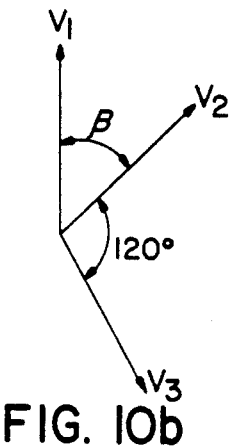
Figure 10C:
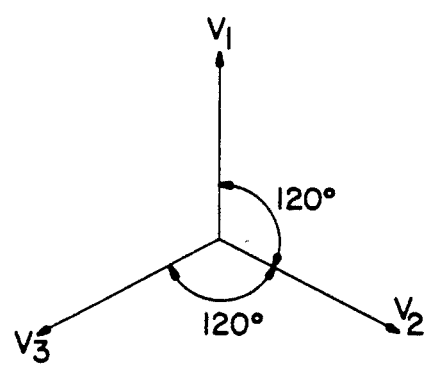

Now referring to FIGS. 10a-10c, the vector diagrams in those figures illustrate the second mode of operation.

The vector $V_1$ represents the first subinverter pair waveforms 220, 222; the vector $V_2$ represents the second subinverter pair waveforms 224, 226; and the vector $V_3$ represents the third subinverter pair waveforms 228, 230. In FIGS. 10a-10c, the phase angle between $V_2$ and $V_3$ is constant, at 120°. The phase angle between $V_1$ and $V_2$ may vary from a minimum phase angle of 15° as shown in FIG. 10a to a maximum phase angle of 120° as shown in FIG. 10c. In between the minimum and maximum phase angles, the phase angle may be any variable angle $\beta$ as shown in FIG. 10b.

Figure 11:
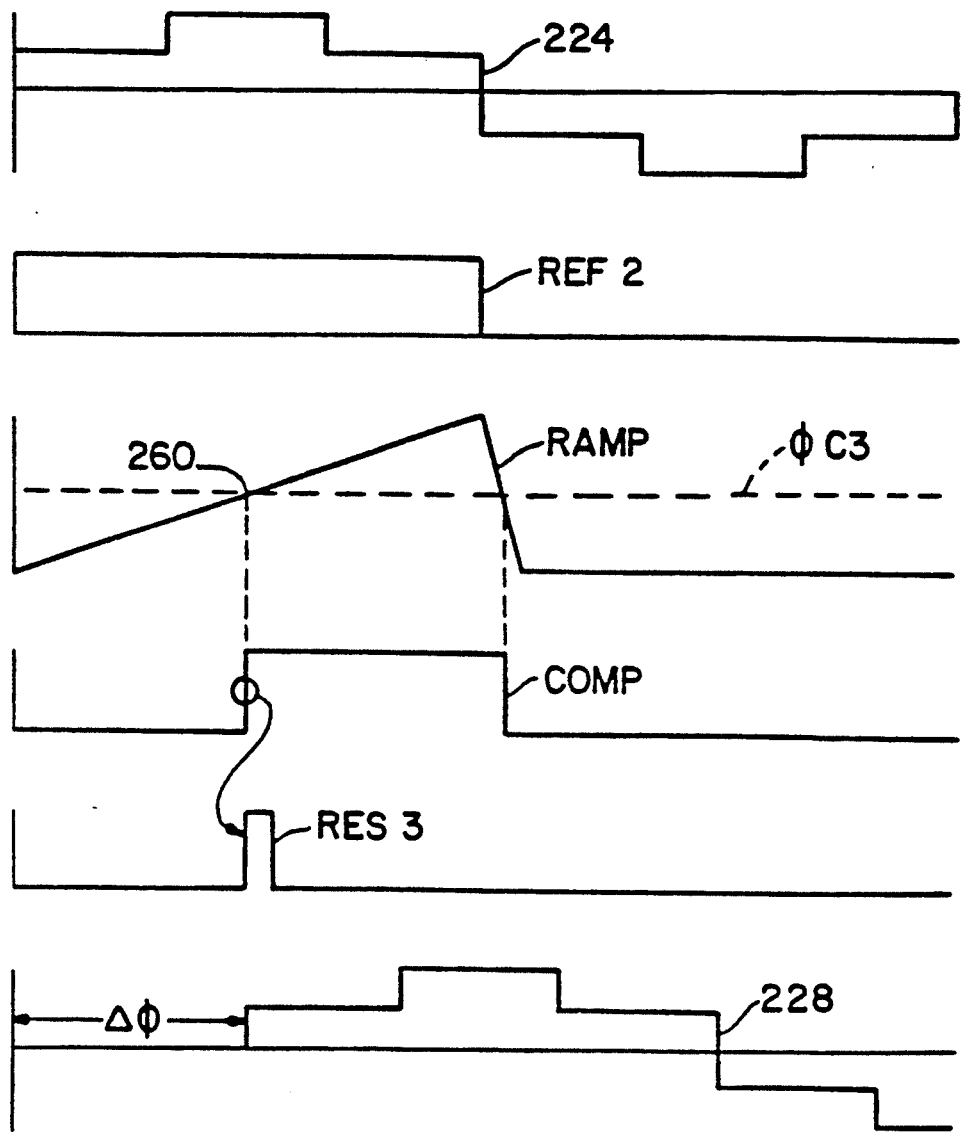
FIG. 11 illustrates various waveforms relating to the operation of the phase angle control circuit of FIG. 2.

One manner of controlling the phase angles is illustrated in FIG. 11, which illustrates the control of the phase angle between the subinverter 32a waveform 224 and the subinverter 34a waveform 228. Referring to Fig. 11, the waveform 224 is shown in its phase relationship with respect to the REF2 signal. As can be seen, REF2 changes from zero to positive when waveform 224 transitions to a positive amplitude and from positive to zero when waveform 224 transitions to a negative amplitude. A ramp signal, RAMP, is generated based upon the magnitude of the REF2 signal. The rising edge of the REF2 signal corresponds to the beginning of the RAMP signal. When the REF2 signal is positive, the amplitude of the RAMP signal slowly increases. When the magnitude of the REF2 signal changes to zero, the magnitude of the RAMP signal quickly decreases to zero.

The RAMP signal is used to generate the RES3 signal based on a phase control signal $\Phi_{c3}$ generated from the phase control signal $\Phi_c$ of FIG. 2. The magnitude of the $\Phi_{c3}$ signal varies, depending upon the magnitude of the current and voltage sensed on the transformer output lines 28a, 28b, 28c. The relative values of the RAMP and $\Phi_{c3}$ signals are used to generate a comparison signal, COMP, having a positive amplitude when the value of the RAMP signal is greater than the value of the $\Phi_{c3}$ signal and a zero amplitude when the value of the RAMP signal is less than the value of the $\Phi_{c3}$ signal. The point of intersection of the rising portion of the RAMP signal and the $\Phi_{c3}$ signal determines the magnitude of the phase delay between the subinverter waveforms. This intersection point is shown as point 260 in FIG. 11.

At the intersection point 260, the COMP signal changes from zero to a positive amplitude. The rising edge of the COMP signal triggers the RES3 signal to become positive, or activated. When the RES3 signal is activated, it resets the counters associated with the third subinverter pair 34. As a result, the counters produce a zero 10-bit address, and the EPROM starts to generate the waveform 228. Thus, the time-occurrence of the rising edge of the RES3 signal controls the phase difference between the waveform 224 and the waveform 228. This phase difference is shown in FIG. 12 as $\Delta\Phi$.

It should be appreciated that the magnitude of the $\Phi_{c3}$ signal determines the magnitude of the phase delay $\Delta\Phi$. If the magnitude of $\Phi_{c3}$ is larger, the $\Phi_{c3}$ signal will intersect the RAMP signal later, thus causing a larger phase delay. If the magnitude of $\Phi_{c3}$ is smaller, the $\Phi_{c3}$ signal will intersect the RAMP signal earlier, thus causing a smaller phase delay.

The manner of varying the phase angle between the first subinverter pair waveforms and the second subinverter pair waveforms is similar to the manner described immediately above, except that the phase angle is between waveforms 220 and 224, REF1 is used in place of REF2, and RES2 is generated instead of RES3.

Figure 12:
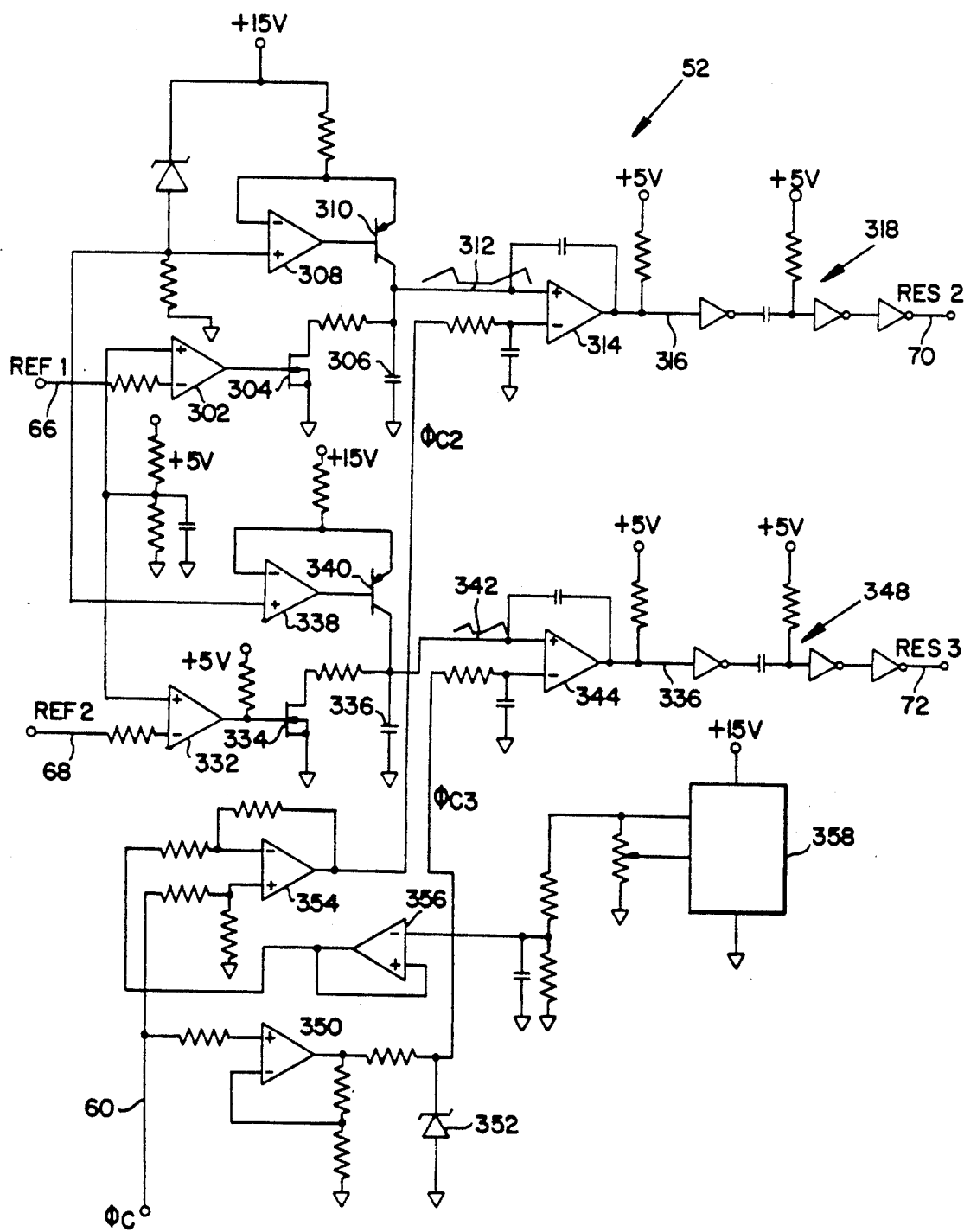
FIG. 12 is a circuit diagram of the phase angle control circuit shown schematically in FIG. 2.
Figure 13:
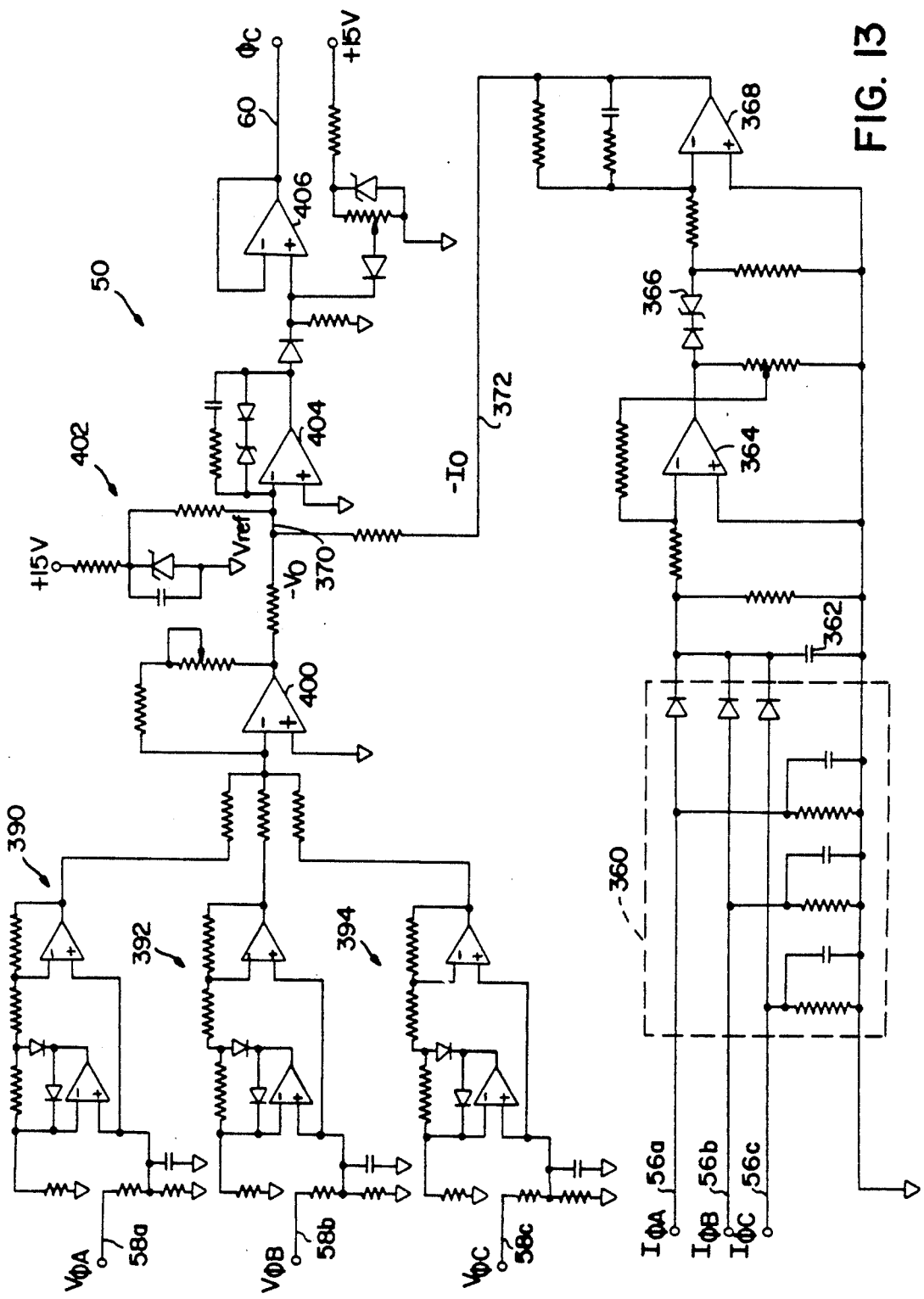
FIG. 13 is a circuit diagram of the output sensing circuit shown schematically in FIG. 2.

One phase angle control circuit 52 for controlling the phase angles between the three subinverter pairs 30, 32, 34 is shown in FIG. 12. The REF1, REF2, and $\Phi_c$ signals are input to the phase angle control circuit 52 via the lines 66, 68, 60, respectively, and the circuit 52 generates the RES2 and RES3 signals on the lines 70, 72, respectively. Referring to FIG. 13, the circuit 52 includes a ramp generator comprising a comparator 302 having an inverting input which receives the REF1 signal and a noninverting input that receives a predetermined reference voltage. The ramp generator also includes a transistor 304, a capacitor 306, and a constant current source comprising an operational amplifier 308 and a transistor 310.

The capacitor 306 is slowly charged by the constant current source via the transistor 310 when the transistor 304 is nonconducting and is quickly discharged through the transistor 304 when the transistor 304 becomes conductive. The transistor 304 conducts when the value of the REF1 signal is less than the predetermined voltage provided at the noninverting input of the comparator 302. As a result, a ramp signal is produced on the line 312.

The ramp signal is input to the noninverting input of a comparator 314 via the line 312. The inverting input of the comparator 314 is supplied with a $\Phi_{c2}$ signal having a magnitude based upon the $\Phi_c$ signal. The comparator 314 generates on a line 316 a comparison signal having a high output when the value of the ramp signal is greater than $\Phi_{c2}$ and a low output when the value of the ramp signal is less than the value of $\Phi_{c2}$. The comparison signal on line 316 is provided to a monostable multivibrator, or one-shot 318 comprising three inverters and a capacitor. The output of the one-shot 318 is the RES2 signal, which determines the phase angle between the waveforms of the first subinverter pair 30 and the waveforms of the second subinverter pair 32.

The RES3 signal is generated in a similar manner. A second ramp generator comprises a comparator 332 having an inverting input that receives the REF2 signal and a noninverting input that receives the reference voltage. The second ramp generator also includes a transistor 334, a capacitor 336, and a constant current source comprising an operational amplifier 338 and a transistor 340.

The capacitor 336 is slowly charged by the constant current source via the transistor 340 when the transistor 334 is not conducting and is quickly discharged through the transistor 334 when the transistor 334 conducts. The transistor 334 conducts when the value of the REF2 signal is less than the predetermined voltage provided at the noninverting input of the comparator 332. As a result, a ramp signal is produced on the line 342.

The ramp signal is input to the noninverting input of a comparator 344 via the line 342. The inverting input of the comparator 344 is supplied with the $\Phi_{c3}$ signal. The comparator 344 generates on a line 346 a comparison signal having a high output when the value of the ramp signal is greater than $\Phi_{c3}$ and a low output when the value of the ramp signal is less than the value of $\Phi_{c3}$. The comparison signal on line 346 is provided to a one-shot 348 comprising three inverters and a capacitor. The output of the one-shot 348 is the RES3 signal which determines the phase angle between the waveforms of the second subinverter pair 32 and the waveforms of the third subinverter pair 34.

The magnitude of the $\Phi_{c2}$ and $\Phi_{c3}$ signals is determined by a third portion of the phase angle control circuit 52 shown in the bottom of FIG. 12, based upon the magnitude of the $\Phi_c$ signal. The $\Phi_{c3}$ signal is generated by an operational amplifier 350 that acts as a voltage follower. Thus, the output of the amplifier 350 follows the magnitude of the $\Phi_c$ signal. A zener diode 352 is connected to the output of the amplifier 350 and acts to limit the magnitude of the $\Phi_{c3}$ signal to a maximum predetermined value. This predetermined value is the voltage that causes a 120° phase angle difference between the second and third subinverter pair waveforms.

The $\Phi_{c2}$ signal is generated by an operational amplifier 354 that acts as an inverter. The $\Phi_c$ signal is supplied to the noninverting input of the amplifier 354, while a predetermined voltage signal is supplied to its inverting input. The predetermined voltage is produced by an operational amplifier 356 having its noninverting input connected to a reference source 358.

The $\Phi_c$ signal is generated by the output sensing circuit 50 based upon the current and voltage sensed on the transformer output lines 28a-c. The output sensing circuit 50 is shown in detail in FIG. 13. Referring to FIG. 13, the output sensing circuit 50 includes a first portion shown at the bottom of FIG. 13 that generates a voltage based on the amount of current sensed in the lines 56a, 56b, 56c. The three phases of output current, $I_{\Phi A}$, $I_{\Phi B}$, $I_{\Phi C}$, on the lines 56a, 56b, 56c, respectively, are rectified by a half-wave rectifier circuit 360. The output of the half-wave rectifier circuit 360 is filtered by a smoothing capacitor 362 and then provided to the inverting input of a operational amplifier 364 used for scaling purposes. The output of the operational amplifier 364 is passed through a zener diode 366 which is coupled to the inverting input of an operational amplifier 368 that acts as an inverter. The operational amplifier 368 generates a negative voltage, $-I_o$, that is zero if the amount of current sensed in the lines 56a, 56b, 56c is not above a predetermined threshold. The current threshold corresponds to twice the rated current for the power conversion system 10. If the current sensed is above the threshold, then the magnitude of $-I_o$ is proportional to the amount of current over the threshold, or overcurrent. The $-I_o$ signal is transmitted to a summing point 370 via a line 372.

The upper portion of the output sensing circuit 50 comprises three precision full-wave rectifiers 390, 392, 394 coupled to receive the phase voltages, $V_{\Phi A}$, $V_{\Phi B}$, $V_{\Phi C}$ on the lines 58a, 58b, 58c, respectively. The rectified phase voltages are summed at the inverting input of an operational amplifier 400. The operational amplifier 400 generates a negative voltage at its output, $-V_o$, which has a magnitude that is proportional to the average output voltage sensed on the lines 58a, 58b, 58c. The $-V_o$ signal is transmitted to the summing point 370.

The summing point 370 is also connected to a circuit 402 that generates a predetermined reference voltage, $V_{ref}$. The $V_{ref}$ voltage represents the desired voltage at which the transformer output lines 28a-c should be kept. At the summing point 370, the $V_{ref}$, $-V_o$, and $-I_o$ signals are summed to produce an error signal, $V_{err}$, which equals $V_{ref}-I_o-V_o$. In normal operation, when the magnitude of the summing transformer output current is below the predetermined current threshold, the value of $-I_o$ will be zero, and the error signal will equal $V_{ref}-V_o$. However, if the output current exceeds the threshold, then $I_o$ will be a nonzero value, and it will effectively reduce the magnitude of the predetermined voltage, $V_{ref}$. If the overcurrent is large enough, the magnitude of $I_o$ will become as large as $V_{ref}$, and the effective reference voltage, $V_{ref}-I_o$, will become zero. As a result, the actual voltage $V_o$ will be reduced to zero. The amount of sensed current necessary to reduce the effective reference voltage to zero is three times the rated current for the system 10. Thus, when the current reaches three times the rated current, the output voltage on the lines 28a-c drops to zero.

The summed error voltage at the summing point 370 is input to the inverting input of an operational amplifier 404 which integrates the error. The amplifier 404 is coupled to an operational amplifier 406 that acts as a buffer and which produces the $\Phi_c$ signal, which ultimately determines the phase relationships of the waveforms generated by the three subinverter pairs 30, 32, 34.

Figure 14:
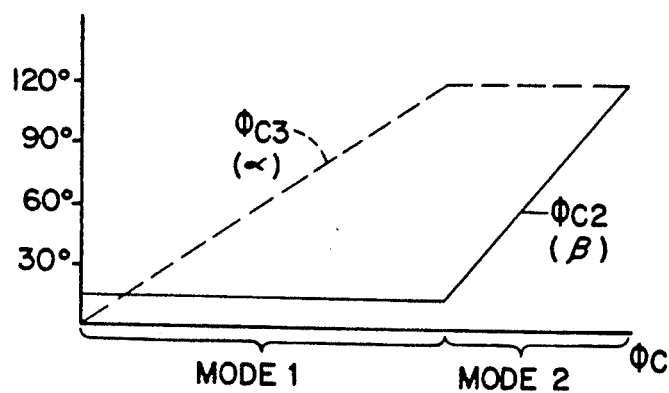
FIG. 14 is a graph of two voltage signals used in the phase angle control circuit to control the phase relationship of the waveforms generated by the inverter.

Referring to FIG. 14, the magnitude of the phase control signals $\Phi_{c2}$ and $\Phi_{c3}$ is shown in the two modes of operation of the inverter 24 with respect to the magnitude of the $\Phi_c$ signal. During the first mode, the $\Phi_{c2}$ signal has a constant voltage that produces a phase angle of 15° between the waveforms of the first subinverter pair 30 and the waveforms of the second subinverter pair 32. In this mode the $\Phi_{c3}$ signal has a voltage that gradually increases to cause a gradually increasing phase angle between the second and third subinverter pair waveforms, until it hits a peak voltage sufficient to cause a 120° phase angle.

During the second mode of operation, the voltage of the $\Phi_{c3}$ signal stays at its peak, and the voltage of the $\Phi_{c2}$ signal gradually increases until it reaches a maximum voltage sufficient to cause a phase angle of 120° between the waveforms of the first subinverter pair 30 and the waveforms of the second subinverter pair 32.

Modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An inverter for use in a power conversion system that produces an AC output, comprising:
   a summing transformer;
   first, second and third subinverters coupled to said summing transformer that generate first, second and third waveforms in said summing transformer, said first and second waveforms having a first variable phase angle between them and said second and third waveforms having a second variable phase angle between them; and
   a regulator circuit coupled to sense the AC output, said regulator circuit controlling said first variable angle and said second variable angle based upon the AC output.

2. An inverter as defined in claim 1 wherein said first variable angle lies within a range having a lower limit of 15° and an upper limit of 120° and wherein said second variable angle lies in a range having a lower limit of 0° and an upper limit of 120°.

3. An inverter for use in a power conversion system that produces an AC output having a current and voltage, comprising:

a summing transformer having first, second and third transformers;

first, second and third subinverters that generate first, second and third waveforms in said first, second and third transformers, respectively, said first and second waveforms having a first variable phase angle between them and said second and third waveforms having a second variable phase angle between them; and a regulator coupled to sense the voltage and current of the AC output, said regulator controlling the first variable angle based upon the voltage of the AC output, said regulator controlling the second variable angle based upon the current of said AC output.

4. An inverter as defined in claim 3 wherein the AC output is the output of said summing transformer.

5. An inverter for use in a power conversion system that produces an AC output having a current and voltage, comprising:

a summing transformer including first, second, third, fourth, fifth and sixth transformers;

first, second, third, fourth, fifth and sixth subinverters that generate first, second, third, fourth, fifth and sixth sets of waveforms in said first, second, third, fourth, fifth and sixth transformers, respectively, said first and second sets of waveforms having a fixed phase angle between them, said third and fourth sets of waveforms having a fixed phase angle between them, said fifth and sixth sets of waveforms having a fixed phase angle between them, said first and third sets of waveforms having a first variable phase angle between them, said third and fifth sets of waveforms having a second variable phase angle between them; and a regulator coupled to sense said AC output, said regulator varying said second variable phase angle in the range between 0° and 120° when the current of said AC output is below a predetermined value, said regulator varying said first variable phase angle when said current is in the range between said first predetermined value and a second predetermined value.

6. An inverter for use in a power conversion system that produces an AC output, comprising:

a summing transformer including first, second, third, fourth, fifth and sixth transformers;

first, second, third, fourth, fifth and sixth subinverters that generate first, second, third, fourth, fifth and sixth sets of waveforms in said first, second, third, fourth, fifth and sixth transformers, respectively, said first and second sets of waveforms having a fixed phase angle between them, said third and fourth sets of waveforms having a fixed phase angle between them, said fifth and sixth sets of waveforms having a fixed phase angle between them, said first and third sets of waveforms having a first variable phase angle between them, said third and fifth sets of waveforms having a second variable phase angle between them; and a regulator coupled to sense said AC output, said regulator varying said first and second variable phase angles based upon the AC output.

7. An inverter as defined in claim 6 wherein said regulator varies said first and second variable phase angles based upon both the current and voltage of the AC output.

8. An inverter as defined in claim 7 wherein said regulator varies said first variable phase angle based upon the voltage of the AC output and said second variable phase angle based upon the current of the AC output.

* * * * *